(12) United States Patent
Walsh

(10) Patent No.: US 6,763,000 B1
(45) Date of Patent: Jul. 13, 2004

(54) MONITORING ATM TRAFFIC LOAD BY QUALITY OF SERVICE TYPE

(75) Inventor: Peter J. Walsh, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/206,672

(22) Filed: Dec. 7, 1998

(51) Int. Cl.[7] .............................................. G06F 11/00
(52) U.S. Cl. .................. 370/252; 370/235; 370/395.21; 370/395.43; 370/410
(58) Field of Search .............................. 370/252, 253, 370/395.1, 395.43, 229, 230–235, 395.2, 395.21, 395.31, 401, 410

(56) References Cited

U.S. PATENT DOCUMENTS

| 5,521,907 | A | * | 5/1996 | Ennis, Jr. et al. ........... 370/253 |
| 5,761,191 | A | * | 6/1998 | VanDervort et al. ........ 370/232 |
| 5,867,483 | A | * | 2/1999 | Ennis, Jr. et al. ........... 370/252 |
| 5,926,478 | A | * | 7/1999 | Ghaibeh et al. ....... 370/395.51 |
| 5,933,425 | A | * | 8/1999 | Iwata ......................... 370/351 |
| 5,949,757 | A | * | 9/1999 | Katoh et al. ................. 370/232 |
| 5,963,555 | A | * | 10/1999 | Takase et al. ............... 370/395 |
| 5,982,748 | A | * | 11/1999 | Yin et al. .................... 370/232 |
| 6,058,102 | A | * | 5/2000 | Drysdale et al. ............ 370/252 |
| 6,097,699 | A | * | 8/2000 | Chen et al. ................. 370/231 |
| 6,108,304 | A | * | 8/2000 | Abe et al. ................... 370/232 |
| 6,226,265 | B1 | * | 5/2001 | Nakamichi et al. ......... 370/235 |
| 6,272,109 | B1 | * | 8/2001 | Pei et al. .................... 370/230 |
| 6,282,197 | B1 | * | 8/2001 | Takahashi et al. ....... 370/395.1 |

OTHER PUBLICATIONS

"ATM User–Network Interface Specification" Version 3.0, Copyright 1993 by The ATM Forum and published by PRT Prentice Hall, Prentice–Hall, Inc., pp. 154–155, 162–163, and 167–168.

* cited by examiner

Primary Examiner—Dang Ton
Assistant Examiner—Tri H. Phan

(57) ABSTRACT

The inventive mechanism monitors ATM traffic load by service type. The inventive mechanism receives each cell being transported over a backbone or link of an ATM network. The mechanism creates a table, which includes the VPI/VCI tags and the respective service type for each tag, to determine the numbers of cells being transported for each of the service types. The mechanism forms the table by monitoring connection/call setup-request cells and their associated answer cells, which identify the service type for each VPI/VCI tag. The inventive mechanism may set alarm levels to trigger based upon the pipe bandwidth usage by the different service types.

21 Claims, 2 Drawing Sheets

MONITORING ATM TRAFFIC LOAD BY QUALITY OF SERVICE TYPE

TECHNICAL FIELD OF THE INVENTION

This application relates in general to ATM systems, and in specific to a mechanism for monitoring and displaying ATM traffic loads by bit rate service type.

BACKGROUND OF THE INVENTION

ATM or asynchronous transfer mode is a data communications standard or protocol that allows the delivery of data packets or cells to and from different network elements. An ATM network allows for the use and transfer of multiple types of data, e.g. constant bit rate, and variable bit rate. Thus data such as frames, packets, video data, voice data, file data, etc. can be transmitted over the ATM network. The ATM protocol organizes data into cells, which are similar to data packets but comprise standard format with a standard length. Each ATM cell is 53 bytes in length, 5 bytes of which are the header, with 48 bytes of data.

The ATM network is a pipeline that comprises a plurality of communication channels. Each channel has a specific quality of service designation or type, with the higher quality channels costing more than lower quality channels. In this instance, higher quality means higher delivery reliability. During periods of high traffic volume, high quality channels will maintain their bandwidths and thus will not lose their cells, while low quality channels will have their bandwidths reduced, and cells may be lost.

There are three service types for channels defined by ATM. The highest quality service type is the constant bit rate or CBR service. This service type is used for data which must be delivered at a constant rate, such as telephone, sound, or video, or else the data transmission would be corrupted. The next lower level service type is the variable bit rate or VBR service. This service type is used for data which may be delivered in bursts and where timing between cells is not critical, such as file transfers. The lowest quality service type available is the ABR service. This service fills the remaining bandwidth in the ATM network pipe after allocation for CBR and VBR services.

A problem with the ATM specification is that it does not provide for any comprehensive network management beyond a policing mechanism, which is used to ensure that a particular customer does not exceed their allocated bandwidth. The policing mechanism tracks the cell usage rate for a particular customer. Network customers contract with the network management for a particular bandwidth at a particular type of service. For example, a customer may be granted 5% of the pipe bandwidth with a CBR service type. Thus, the policing function tracks the cell usage to ensure that this customer never exceeds their allocated bandwidth. Note that the policing mechanism usually tracks both burst usage and cells per second usage. A burst limit restricts the number of cells that can be transmitted back-to-back, whereas cells per second represents an average over a time period. However, this limited mechanism does not provide a network manager with an adequate characterization of network performance.

Therefore, there is a need in the art for a ATM management mechanism that provides a network manager with information about network traffic over time.

SUMMARY OF THE INVENTION

These and other objects, features and technical advantages are achieved by a system and method which monitors ATM traffic load by service type.

The inventive mechanism receives each cell being transported over the ATM network, and determines relative numbers of cells of each of the service types with respect to the total bandwidth of the network.

The inventive mechanism is a real-time data collection protocol analyzer. The mechanism maintains a network table wherein each customer connection or channel in an particular ATM backbone link is identified as to its type of quality of service, i.e. CBR, VBR, or ABR. The mechanism forms the table by monitoring signaling channel cells, in particular connection/call setup-request cells (request for service cells) and their associated connection call answer cells (acknowledgment cells) during service negotiations. In these cells, the service type is identified for each customer channel, wherein each channel is denoted by a Virtual Path Identifier/Virtual Circuit Identifier (VPI/VCI) tag in the header of each cell. The mechanism also tracks the number of cells per second for each of the identified VPI/VCI tags. The mechanism then groups the VPI/VCI tags according to each type of service and thus, can determine and display the manner in which the entire bandwidth of a particular pipe is used by service type.

The inventive mechanism may utilize alarm levels for each aggregate traffic type or group of types. For example, an alarm could be set to trigger if CBR exceeds 20% of available pipe bandwidth.

Therefore, it is a technical advantage of the present invention to monitor ATM network traffic by service type.

It is another technical advantage of the present invention to determine trends in traffic usage of the network to permit upgrade forecasting.

It is a further technical advantage of the present invention to maintain a table, in real time, that lists VPI/VCI tags, along with the service type and bandwidth usage for each tag.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 1:
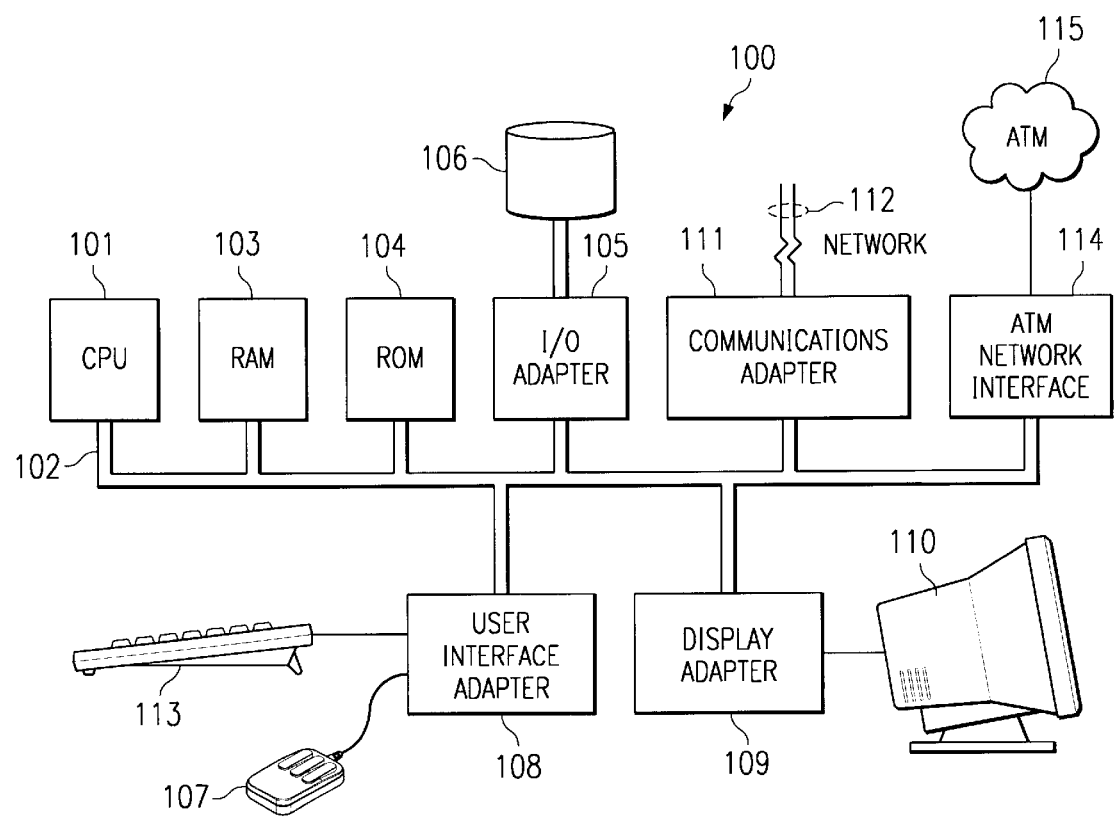
FIG. 1 depicts a high level block diagram of a computer system adapted to implement the present invention.

FIG. 1 depicts a computer system 100 adapted to use the present invention. Central processing unit (CPU) 101 is coupled to bus 102. In addition, bus 102 is coupled to random access memory (RAM) 103, read only memory (ROM) 104, input/output (I/O) adapter 105, communications adapter 111, user interface adapter 108, and display adapter 109.

RAM 103 and ROM 104 hold user and system data and programs as is well known in the art. I/O adapter 105 connects storage devices, such as hard drive 106 or CD ROM (not shown), to the computer system. Communications adaptor 111 couples the computer system to a local, wide-area, or Internet network 112. User interface adapter 108 couples user input devices, such as keyboard 113 and pointing device 107, to the computer system 100. Finally, display adapter 109 is driven by CPU 101 to control the display on display device 110. CPU 101 may be any general purpose CPU, such as a HP PA-8200. However, the present invention is not restricted by the architecture of CPU 101 as long as CPU 101 supports the inventive operations as described herein. The inventive system 100 includes ATM network interface 114 which couples system 100 into ATM network 115.

The inventive system 100 performs a real time data collection of the ATM network 115. The inventive system 100 is a protocol analyzer that identifies each customer connection as to its type of quality of service. The types of service are constant bit rate (CBR), variable bit rate (VBR), and available bit rate (ABR).

The system 100 intercepts each cell being transported on the ATM network, and examines the VPI/VCI channel associated with each cell. The VPI/VCI channel, or virtual path identifier/virtual channel identifier, is an ATM addressing mechanism which identifies the originator of the cell, and the destination of the cell. Note that a particular customer may have more than one VPI/VCI channel associated with their location, particularly for different service types, e.g. one VPI/VCI from CBR traffic and another for ABR traffic, both which originate from the same location. Note that interface 114 may directly receive each cell on the network, and then re-transmit the received cells. Alternatively, the interface may indirectly receive each cell, via an inductive tap (or light tap if the network is using fiber optic cable). The traffic on the ATM network 115 may be transported via wire or fiber optic cable, microwave link, or satellite link.

From the intercepted cells, the system constructs a cell table which tracks the number of cells being transported on the network 115, according to the VPI/VCI channels. Thus, the cell table lists each VPI/VCI channel or switched virtual circuit (SVC) and the number of cells associated with the channel on the network. This table would reside in memory 103 until stored to hard drive 106 or other storage media. Note that this table is constructed dynamically, and would cover a particular time period. For example, assume that the cell table comprises all cells transported over a channel within a particular second, another cell table would tabulate the next second, and so on such that 60 cell tables would be constructed over one minute, and 3600 tables would be constructed over one hour, etc. Note that the same table can be modified every second, with just the changes saved to disk. Each of the different tables may be separately stored. Alternatively, tables may be overwritten when space is required for additional tables. The time period may be varied to suit the needs of the user of the analyzer system 100. Note that one arrangement for the cell table would be to have the different VPI/VCI channels in one column, with respective cell usage % bandwidth or cells per second in another column.

The system 100 also maintains a service type table which lists the VPI/VCI channels of the customers of the network 115, and the particular service type associated with each particular VPI/VCI channel. This list would comprise each VPI/VCI channel and the service type, i.e. CBR, VBR, or ABR, for the respective channel. Note that each tag has only one service type. If a customer has multiple types of service, then the customer will have multiple channels or VPI/VCI's, with one channel for each type of service. A customer can have more than one channel with the same type of service, e.g. two tags both CBR. Note that this list is dynamically constructed and maintained. The system 100 monitors the operation and management cells being transported on the network. These cells are defined by the ATM standard specification, ATM User Network Interface Specification, Version 3.0 from the ATM Forum which is hereby incorporated by reference. Thus, the table is modified as channels are being added or deleted from network service. This table would reside in memory 103 until stored to hard drive 106 or other storage media. Note that only one-service table would be needed, as the table is dynamically modified. Further note that one arrangement for the service type table would be to have the different VPI/VCI channels in one column, with respective service types in another column.

Of the signaling channel cells, the connection/call setup-request and their associated connection/call answer cells are of particular interest. These cells describe the service negotiations between a customer and the network provider. The customer would send a connection/call setup-request cell specifying a desired service type, i.e. CBR, VBR, or ABR, and the desired bandwidth, e.g. the number of cells per second. The network provider then replies with a call proceeding and/or a call connect cell which details the granted service type and bandwidth. Note that the customer is assigned a VPI/VCI channel in the call proceeding cell or call connect. This negotiation is the start up procedure for adding a new channel to the network pipeline or the backbone. Note that the prior art policing mechanism discussed in the background section would monitor the bandwidth usage of a particular customer to ensure that the customer does not exceed the granted bandwidth.

The system could form a single network table which has the information of both the cell table and the service type table, and thus will list the different VPI/VCI channels, with their respective service types and cells per time period usage (or bandwidth usage). The system would then determine the number of cells per time period for each service type by adding bandwidth usage for the like service types together. The total cells for each service would then be divided by the pipeline or network bandwidth to normalize the bandwidth usage. Thus, the system can determine the number of cells being transported on the network 115 for each service type at any given time or period of time with respect to the network bandwidth. This table would reside in memory 103 until stored to hard drive 106 or other storage media. Note that this table is constructed dynamically, and would cover a particular time period. For example, assume that the combined network table comprises all cells transported over a channel within a particular second, another table would tabulate the next second, and so on such that 60 tables would be constructed over one minute, and 3600 tables would be constructed over one hour, etc. Each of the different tables may be separately stored. Alternatively, tables may be overwritten when space is required for additional tables. The time period may be varied to suit the needs of the user of the analyzer system 100.

Figure 2:
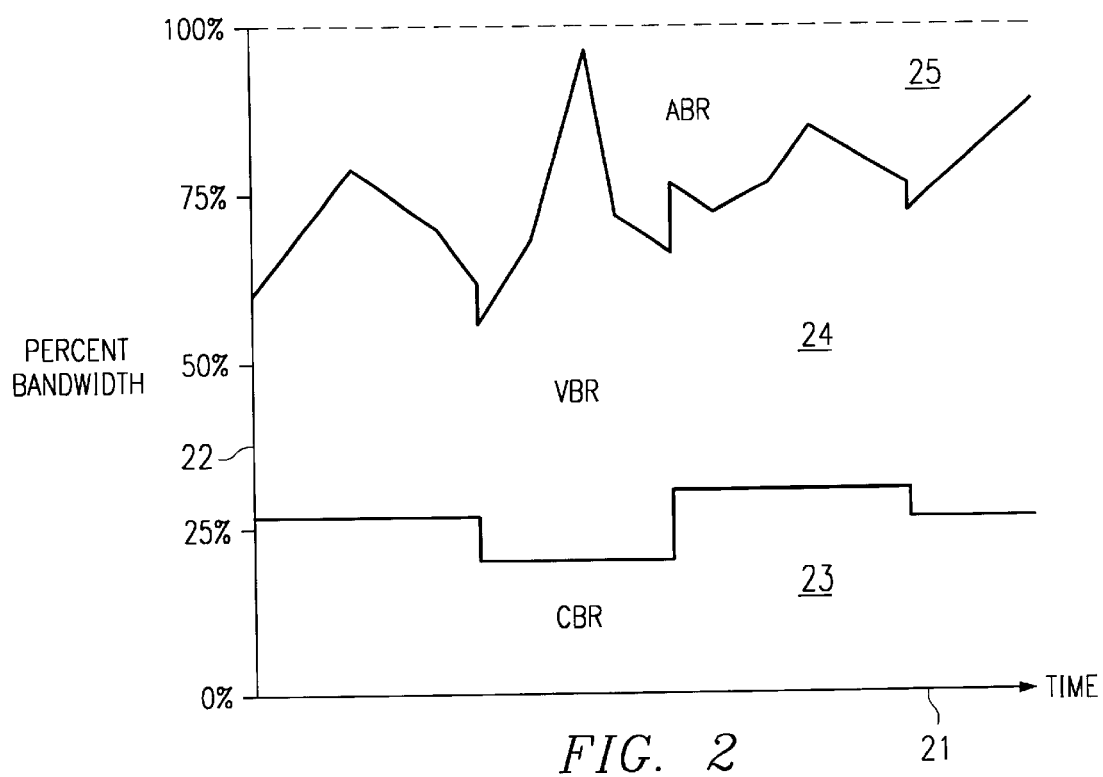
FIG. 2 depicts a graphical display produced by the inventive system of FIG. 1 showing the different traffic types on an ATM network.

The results can be graphically displayed to a user on display device 110, and would appear as shown in FIG. 2.

Note that the depicted arrangement of FIG. 2 is by way of example only, as different layouts for the results can be used, so long as the traffic loads for the different service types are displayed, i.e. CBR, VBR, and ABR. For example, the different service types may be depicted with different colors, patterns, or 3D appearance. The x axis 21 represents time, which may be scaled to represent years, days, hours, minutes, seconds, or fractions of seconds, as desired by the user. The y axis 22 represents a percent bandwidth of the pipeline or network 115. CBR 23 represents a summation cell usage of the different VPI/VCI tags of having the CBR service type. VBR 24 represents a summation cell usage of the different VPI/VCI channels of having the VBR service type. ABR 25 represents a summation cell usage of the different VPI/VCI channels of having the ABR service type. The different values of CBR 23, VBR 24, and ABR 25 are shown to change with respect to time. Note that CBR 23 remains relatively constant, and a high VBR 24 reduces the amount of ABR 25.

Note that one arrangement for the combined network table would be to have the different VPI/VCI channels in one column, with respective service type and respective cell usage in other columns. Note that the inventive system 100 may track additional parameters, and place those parameters into the combined table. For example, a fourth column may represent a total cell usage to date for the different VPI/VCI channels.

Figure 3:
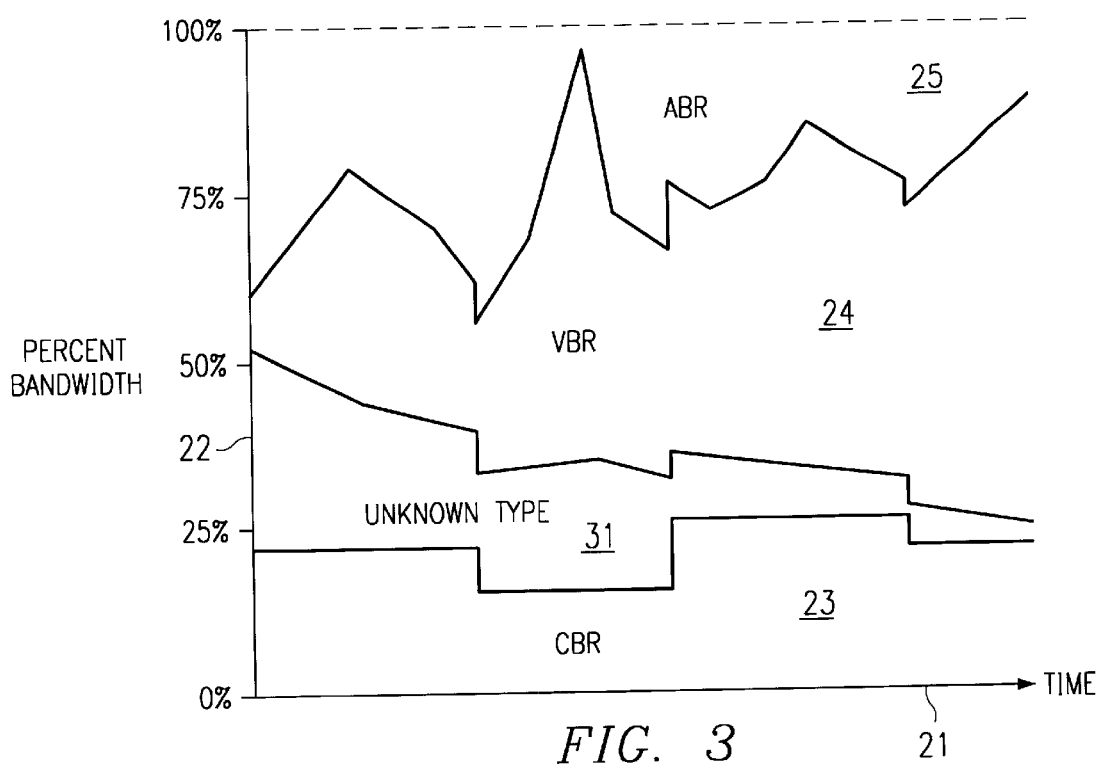
FIG. 3 depicts a graphical display produced by the inventive system of FIG. 1 showing the different-traffic types on an ATM network, including an unknown type.

Note that analyzer system 100 is likely to be connected to the network 115 after the network 115 has been operational. Thus, the service type table will only list newly created VPI/VCI channels or channels that have had their service type modified subsequent to the connection of the system 100 to the network. This is because cells are sent only during an initialization or modification of service. Thus, customers with established, unchanged channels will not have their service type identified. This is particularly relevant for permanent virtual circuits (PVCs) which tend to be unchanging customers, e.g. a telephone company, and generally have CBR type of service. This is depicted in FIG. 3, which shows an output display similar to that of FIG. 2, but includes an unknown type 31. Note that over time, the unknown type 31 is decreasing. This is because, over time, unknown channels (or VPI/VCI's) are being deleted, while others are having their service types identified when a change of service is requested. Any remaining channels with unknown service type would have their service type manually entered on to the service type list by a network manager. Note that by selecting the area of interest on the graph, the table associated with that particular service type is accessed, and then can be changed or viewed. Note that the tables can be organized in order of bandwidth usage, either ascending or descending amounts. The tables can also be organized by age of the VPI/VCIs, either from ascending age or descending age.

The channels with the unknown QOS (Quality Of Service) type can be identified by a simple auto-determine mechanism. Through monitoring the usage statistics of a channel for which it's QOS type is unknown, a particular VPI/VCI can be classified as either CBR or ABR/VBR. For example, some channels can be identified by their transmission characteristics, particularly those channels of the CBR type. CBR channels would transport cells in synchronous, constant, time slots. If the cells on a particular channel have a non-constant transportation rate, i.e. the channel burst sends cells, then the channel would be either VBR or ABR type.

The inventive system 100 could also incorporate an alarm mechanism. The alarm mechanism could be set to trigger when particular ones of the different service types or combinations of the service types exceed a preset threshold value. For example, an alarm could trigger if CBR+VBR exceeds 80%, or if CBR equals or exceeds 30%. Since CBR+VBR+ABR equals 100%, the alarms could also be set to trigger when a minimum value is reached. For example, an alarm could trigger if ABR is less than 20%. Alarms could also be set so that if any type falls below a minimum, which could indicate a fault condition. Note that the phrase "exceeds a threshold" means greater than a maximum threshold or less than a minimum threshold. These types of alarms indicate extreme changes network dynamics, and would be useful to system managers in deciding when to add or remove bandwidth.

Although the present invention and its advantages have been described in detail, it should be understood that various changes, substitutions and alterations can be made herein without departing from the spirit and scope of the invention as defined by the appended claims.

What is claimed is:

1. A system for monitoring cell traffic on a network, wherein each cell is associated with a channel that identifies a particular network element, and wherein the network has a plurality of service types, each of which indicates a network priority, the system comprising:

an interface with the network for intercepting cells; and an analyzer that examines the intercepted cells to determine, a number of cells that are associated with a particular channel, the service type associated with the particular channel, and the relative usage of the network by each service type, wherein the analyzer includes at least one table listing the channels, the service types associated with each particular channel, and a number of intercepted cells for each particular channel.

2. The system of claim 1, further comprising:

a display device for graphically presenting information derived by the analyzer.

3. The system of claim 1, wherein:

the network is an asynchronous transfer mode network; and each channel is identified by a virtual path identifier/virtual channel identifier (VPI/VCI) tag.

4. The system of claim 1, wherein the analyzer comprises:

means for determining a particular channel for each intercepted cell.

5. The system of claim 4, wherein the analyzer further comprises:

means for dynamically forming a portion of the at least one table by intercepting connection cells that describe the service type being granted to a particular channel.

6. The system of claim 1, wherein:

the at least one table is updated after the particular channel has been determined for each intercepted cell.

7. The system of claim 1, wherein:

the analyzer formats information derived from the intercepted cells to indicate a relative usage of the network by each service type.

8. The system of claim 7, further comprising:

an alarm which is triggered when a particular service type exceeds a predetermined threshold for an amount of relative usage.

9. The system of claim 1, further comprising:

an alarm that is triggered when a portion of information derived from the intercepted cells exceeds a predetermined threshold.

10. A method for monitoring cell traffic on a network, wherein each cell is associated with a channel that identifies a particular network element, and wherein the network has a plurality of service types, each of which indicates a network priority, the method comprising:

intercepting cells being transported on the network;

examining the intercepted cells to determine a number of cells that are associated with a particular channel, the service type associated with the particular channel, and the relative usage of the network by each service type; and consulting at least one table listing the channels, the service types associated with each particular channel, and a number of intercepted cells for each particular channel.

11. The method of claim 10, further comprising:

displaying, graphically, information derived from the examining of the intercepted cells on a display device.

12. The method of claim 10, wherein:

the network is an asynchronous transfer mode network; and each channel is identified by a virtual path identifier/ virtual channel identifier (VPI/VCI) tag.

13. The method of claim 10, wherein the examining comprises:

determining a particular channel for each intercepted cell.

14. The method of claim 13, wherein the examining further comprises:

dynamically forming a portion of the at least one table by intercepting connection cells that describe the service type being granted to a particular channel.

15. The method of claim 13, wherein the examining further comprises:

updating the at least one table after the particular channel has been determined for each intercepted cell.

16. The method of claim 10, further comprising:

formatting information derived from the intercepted cells to indicate a relative usage of the network by each service type.

17. The method of claim 16, further comprising:

triggering an alarm when a particular service type exceeds a predetermined threshold for an amount of relative usage.

18. The method of claim 10, further comprising:

triggering an alarm when a portion of information derived from the intercepted cells exceeds a predetermined threshold.

19. A system for monitoring cell traffic on an asynchronous transfer mode network, wherein each cell is associated with a channel that is identified by a virtual path identifier/ virtual channel identifier (VPI/VCI) tag that identifies a particular network element, and wherein the network has a plurality of service types, each of which indicates a network priority, the system comprising:

an interface with the network for intercepting cells;

an analyzer that examines the intercepted cells, to determine a number of cells having a particular VPI/VCI tag, the service type associated with the particular VPI/VCI tag, and a relative usage of the network by each service type; and a display device for graphically presenting information derived by the analyzer;

wherein the analyzer includes means for determining a particular VPI/VCI tag for each intercepted cell, and at least one table listing a plurality of VPI/VCI tags, the associated service type for each VPI/VCI tag, and a number of intercepted cells for each particular VPI/VCI tag.

20. The system of claim 1, wherein the at least one table further lists a total cell usage to date for each particular channel.

21. The method of claim 10, wherein the at least one table further lists a total cell usage to date for each particular channel.

* * * * *